J. ROTHCHILD.
VALVE.
APPLICATION FILED DEC. 19, 1908. RENEWED DEC. 2, 1909.

946,877.

Patented Jan. 18, 1910.

Attest:

Inventor:
Joseph Rothchild
by William R. Baird
his Atty.

J. ROTHCHILD.
VALVE.
APPLICATION FILED DEC. 19, 1908. RENEWED DEC. 2, 1909.
946,877.
Patented Jan. 18, 1910.
2 SHEETS—SHEET 2.
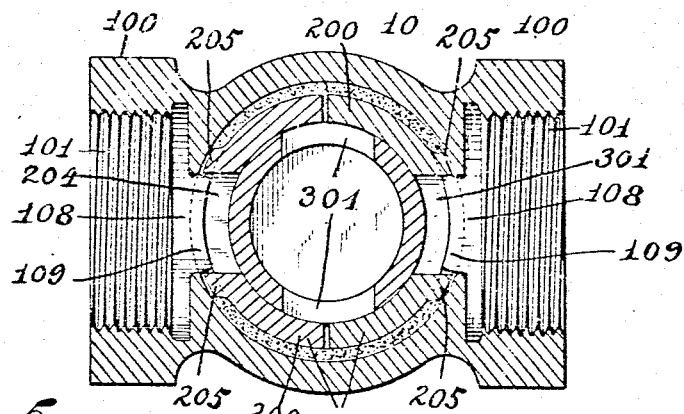
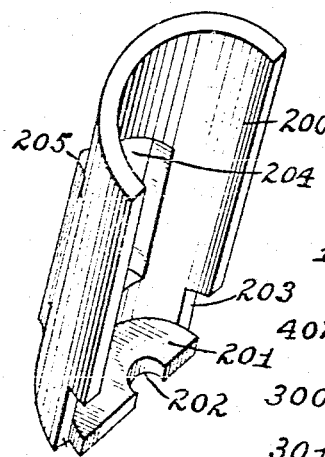
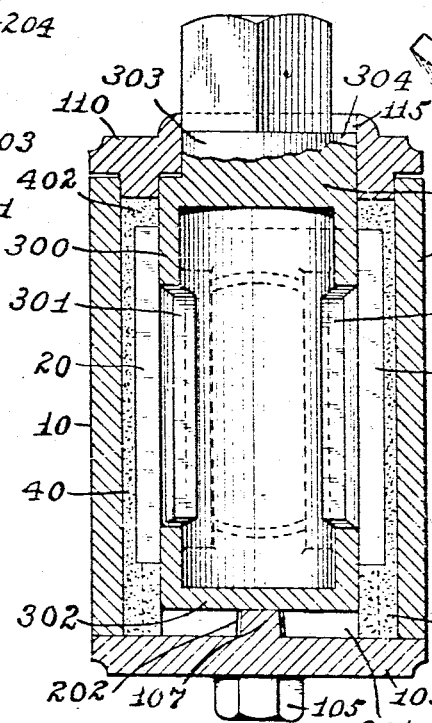
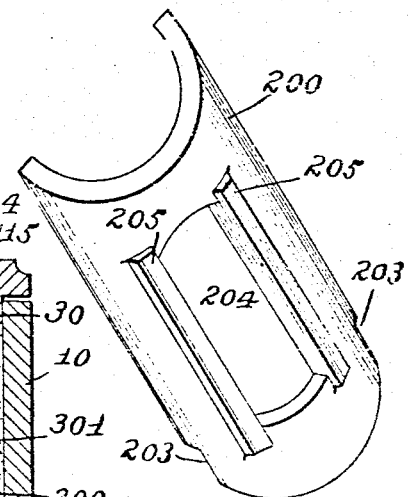
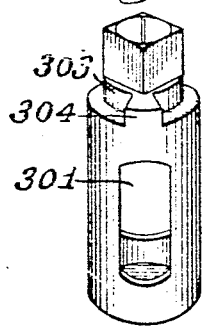
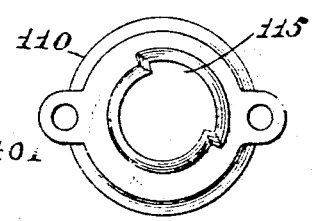
Attest:
May Hughes
Inventor:
Joseph Rothchild,
by William R. Ward
his Atty.

UNITED STATES PATENT OFFICE.

JOSEPH ROTHCHILD, OF BAYONNE, NEW JERSEY, ASSIGNOR TO JOHN SIMMONS COMPANY, OF NEW YORK, N. Y., A CORPORATION OF NEW YORK.

VALVE.

946,877.  Specification of Letters Patent.  Patented Jan. 18, 1910.

Application filed December 19, 1908, Serial No. 468.279. Renewed December 2, 1909. Serial No. 531,069.

*To all whom it may concern:*

Be it known that I, JOSEPH ROTHCHILD, a citizen of the United States, and resident of Bayonne, Hudson county, New Jersey, have invented certain new and useful Improvements in Valves, of which the following is a specification.

This invention relates to valves and its novelty consists in the construction and adaptation of the parts as will be more fully hereinafter pointed out.

Figure 1:
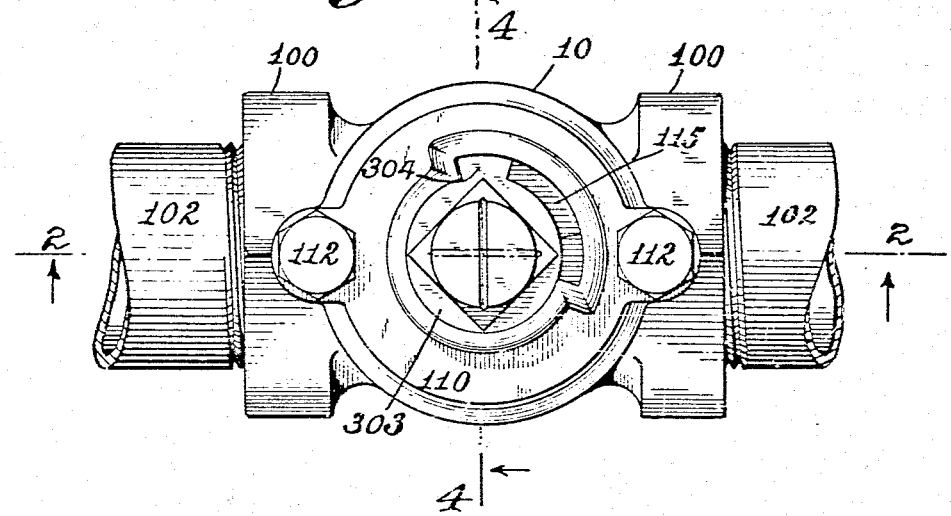
Figure 2:
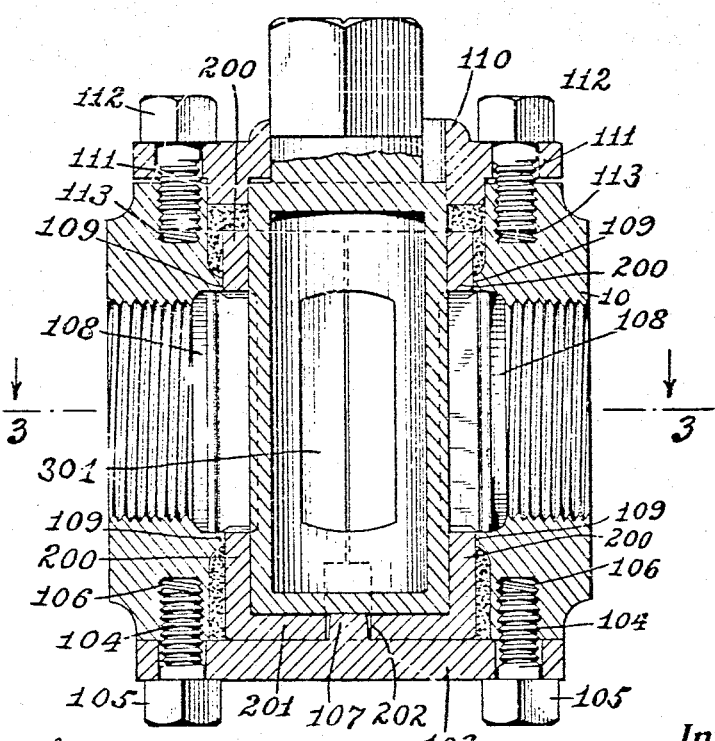

In the drawings, Figure 1 is a top plan view of the valve body placed in a line of piping; Fig. 2 is a central section on the plane of the line 2—2 in Fig. 1; Fig. 3 is a transverse section on the plane of the line 3—3 in Fig. 2; Fig. 4 is a central section on the plane of the line 4—4 in Fig. 1, Figs. 5 and 6 are perspectives of the two members of the casing. Fig. 7 is a perspective view of the hollow plug and Fig. 8 is a top plan view of the cylinder.

In the drawings, 10 is the valve body preferably made in the form of a cylinder and provided on opposite sides with two outwardly extending flanges 100, each provided with internal threads 101 to receive the threaded ends of the sections of pipe 102 between which the valve is placed. It is provided with a bottom 103 secured to the cylinder by means of screws 104 having hexagonal heads 105 and which screws engage the threaded apertures 106 formed in the cylinder to receive them. A centrally arranged upwardly extending positioning pin 107 is secured to or made integral with the bottom 103. The walls of the cylinder adjacent to the flanges 100 are provided with apertures 108, and above and below each aperture is an inwardly projecting flange 109. The valve body is also provided with a top 110 secured to the cylinder by means of screws 111 having hexagonal heads 112 and which screws engage threaded apertures 113 formed in the cylinder to receive them. The top is provided with a circular aperture expanded along an arc 115 to receive a projecting fin 304 on the valve flange.

The casing 20 of the valve is formed of two cylindrical segments 200. Each segment has at its lower extremity an inwardly extending plate 201 having a central recess 202 adapted to engage the pin 107. It also has a notch or recess 203 at its inner lower edge, and a central longitudinal aperture 204. On the outer surface of each segment and on each side of the aperture 204 are longitudinal outwardly projecting flanges 205 adapted to engage the flanges 109 of the valve body.

The plug or key 30 of the valve comprises a hollow cylinder 300 having two diametrically arranged longitudinal apertures 301 and a bottom 302. It is closed at the top and externally is restricted to form a neck 303 adapted to fit within the circular aperture in the top 110 of the valve body. Projecting radially from the neck is a fin 304 adapted to move within the expanded arc 115 of the body top 110.

A suitable packing 40 is arranged between the valve body 10 and the casing 20 except in front of the longitudinal apertures 204 of the latter. As will be observed, its position is defined by the flanges 205. Above and below these flanges, however, it is extended in continuous rings 401 around the casing. It is also extended in a continuous ring 402 above the casing and between the inner surface of the valve body 10 and the outer surface of the valve plug 30, and is further placed in the space within the notches or recesses 203 and outside of that portion of the valve plug 30 below the apertures 301.

It is obvious that modifications may be made in the device with the skill of a competent workman and that the shape, size, form, and to some extent, the arrangement of the parts may be varied without departing from the principles upon which the invention is based.

Several things are to be noted concerning the valve. In many valves at present in use a packing is interposed between a central plug and a casing or body. Such packing when the plug is rotated is apt to be caught by the edges of the plug aperture and to be subjected to a destructive cutting or shearing action, or to roll up and pull away from its position. With this valve nothing of that kind can happen. The plug rotates in the casing, one metal surface being opposed to the other and the packing between the casing and the valve body is between surfaces which have no relative circular movement. The packing between the plug and the valve body above the casing and where the casing is notched at the bottom is between surfaces which are smooth and have no apertures with edges to cause a disruption of such packing. These valves are intended to be used when fluids at different temperatures are passed through them. The parts, therefore, expand and contract, as such fluids are hot or cold. In the valves of the present art, the expansion of the plug and casing or body usually means a tightening of the parts and its contraction a loosening of the parts. This does not occur with my valve. The segments of the casing are loose with respect to each other. The packing between the casing and valve body forms a cushion which is compressed when the segments move outward and expands when they move inward. But the plug and casing segments always make together a tight fit. The plug is of the same diameter throughout. It is cylindrical and not conical. The surrounding segments are cylindrical. The result is that the same surfaces are always presented to each other in succession and there is little or no wear and always a tight fit. The undue pressure against the plug when its aperture does not register with the segment apertures and the valve is closed, which is exerted against the surface of the plug by a fluid in one of the pipes, simply presses the valve away from the segment on that side and toward the opposite segment. This leaves a slight space between the first segment and the plug and the fluid can leak around the plug and within the segment until it reaches the space between the longitudinal edges of the two segments. It can go no farther because the packing between the plug and valve body above the casing and at the lower edges of the casing when its segments are notched prevents it. The valve is readily made, is simple in construction and has the unusual merit that the plug and casing can, by removing the top and bottom bolts, be entirely removed without disturbing the place of the valve body in the line of pipe.

What I claim as new is:—

1. A valve comprising an apertured valve-body with means whereby it may be inserted between two fluid conduits, a segmental casing within the valve body having apertures to permit of the passage of a fluid, a central apertured plug adapted to be rotated within the casing and a suitable packing between the valve body and the casing.

2. A valve comprising an apertured valve-body with means whereby it may be inserted between two fluid conduits, a segmental casing within the valve-body having apertures to permit of the passage of a fluid, a central plug having apertured and unapertured portions and adapted to be rotated within the casing and a suitable packing interposed between the valve body and the casing and the valve body and the unapertured part of the plug.

3. A valve comprising a central rotatable apertured plug, a removable apertured casing surrounding the plug at its aperture and on each side thereof, an external body surrounding the casing and a suitable packing between the body and the casing and such parts of the plug as are not surrounded by the casing.

4. A valve body comprising a cylindrical body, flanges whereby it may be inserted in a pipe line, a removable bottom, a removable top and apertures registering with the flanges to permit the passage of fluid therethrough and inwardly projecting flanges adjacent to such apertures.

5. A valve body comprising a cylindrical body, flanges whereby it may be inserted in a pipe line, a removable bottom, a removable top and apertures registering with the flanges to permit the passage of fluid therethrough and inwardly projecting flanges adjacent to such apertures, the bottom being provided with a positioning device for a central plug.

6. A valve body comprising a cylindrical body, flanges whereby it may be inserted in a pipe line, a removable bottom, a removable top and apertures registering with the flanges to permit the passage of fluid therethrough, the removable top being apertured to permit of the passage of a central plug, said aperture being enlarged over an arc less than a diameter in length.

7. A valve body comprising a cylindrical body, flanges whereby it may be inserted in a pipe line, a removable bottom, a removable top and apertures registering with the flanges to permit the passage of fluid therethrough, and inwardly projecting flanges adjacent to such apertures, the bottom being provided with a positioning device for a central plug, and the top being apertured to permit of the passage of the plug.

8. A valve body comprising a cylindrical body, flanges whereby it may be inserted in a pipe line, a removable bottom, a removable top and apertures registering with the flanges to permit the passage of fluid therethrough, and inwardly projecting flanges adjacent to such apertures, the bottom being provided with a positioning device for a central plug, and the top being apertured to permit of the passage of the plug, and having means whereby the plug is guided and limited in its movement.

9. A valve casing comprising a pair of cylindrical segments, each having longitudinal apertures for the passage of fluid and outwardly projecting flanges adjacent to such apertures.

10. A valve casing comprising a pair of cylindrical segments, each having longitudinal apertures for the passage of fluid and each provided with an inwardly projecting positioning disk.

11. A valve casing comprising a pair of cylindrical segments, each having longitudinal apertures for the passage of fluid and each provided with an inwardly projecting positioning disk having a central recess.

12. A valve casing comprising a pair of cylindrical segments, each having longitudinal apertures for the passage of fluid and outwardly projecting flanges adjacent to such apertures, each segment being provided with an inwardly projecting positioning disk.

13. A valve casing comprising a pair of cylindrical segments, each having longitudinal apertures for the passage of fluid and outwardly projecting flanges adjacent to such apertures, each segment being provided with an inwardly projecting positioning disk having a central recess.

14. A valve comprising a central rotatable apertured plug, and a surrounding apertured casing consisting of segments having longitudinal apertures registering with the plug aperture, each segment having an inwardly projecting positioning disk.

15. A valve comprising a central rotatable apertured plug, and a surrounding apertured casing consisting of segments having longitudinal apertures registering with the plug aperture, each segment having an inwardly projecting positioning disk, in combination with a body in which the casing is placed and the plug is adapted to rotate and provided with a packing between the opposed surfaces of the body and casing and the body and plug.

16. A valve comprising a central rotatable cylindrical plug having a transverse aperture, a casing surrounding the plug and made of apertured cylindrical segments, an apertured valve body in which the casing is secured and an elastic medium interposed between the casing and the valve body.

17. A valve comprising a central rotatable cylindrical plug having a transverse aperture, a casing surrounding the plug and made of apertured cylindrical segments, an apertured casing surrounding the plug and made cured, means for fixing the relative position of the casing and valve body and an elastic medium interposed between the casing and the valve body.

18. A valve comprising a central rotatable cylindrical plug having a transverse aperture, a casing surrounding the plug and made of apertured cylindrical segments, an apertured valve body in which the casing is secured, means for fixing the relative position of the casing and valve body, including a positioning pin, and an elastic medium interposed between the casing and the valve body.

19. A valve comprising a central rotatable cylindrical plug having a transverse aperture, a casing surrounding the plug and made of apertured cylindrical segments, an apertured valve body in which the casing is secured, means for fixing the relative position of the casing and valve body, including flanges adjacent to the segment apertures, and an elastic medium interposed between the casing and the valve body.

20. A valve comprising a central rotatable cylindrical plug having a transverse aperture, a casing surrounding the plug and made of apertured cylindrical segments, an apertured valve body in which the casing is secured, means for fixing the relative position of the casing and valve body, including coöperating positioning flanges on the segments and valve body, and an elastic medium interposed between the casing and the valve body.

21. A valve comprising a central rotatable apertured plug, a removable apertured casing surrounding the plug at its aperture and on each side thereof, an external body surrounding the casing, the longitudinal surfaces of the plug and casing being parallel to each other.

22. A valve comprising a central rotatable apertured plug, a removable apertured casing surrounding the plug at its aperture end and on each side thereof, an external body surrounding the casing and a suitable packing between the body and the casing and such parts of the plug as are not surrounded by the casing, and means for preventing the rotation of the casing within the valve body.

23. A valve comprising a central rotatable apertured plug, a removable apertured casing surrounding the plug at its aperture end and on each side thereof, an external body surrounding the casing and a suitable packing between the body and the casing and such parts of the plug as are not surrounded by the casing, and means for preventing the rotation of the casing within the valve body, consisting of outwardly extending flanges on the casing and inwardly extending flanges on the valve body.

24. A valve comprising a central rotatable cylindrical plug having a transverse aperture, a casing surrounding the plug and made of apertured cylindrical segments, an apertured valve body in which the casing is secured and an elastic medium interposed between the casing and the valve body and means for preventing the rotation of the casing within the valve body.

25. A valve comprising a central rotatable cylindrical plug having a transverse aperture, a casing surrounding the plug and made of apertured cylindrical segments, an apertured valve body in which the casing is secured and an elastic medium interposed between the casing and the valve body and means for preventing the rotation of the casing within the valve body, consisting of outwardly extending flanges on the casing and inwardly extending flanges on the valve body.

26. A valve comprising a central rotatable cylindrical plug having a transverse aperture, a casing surrounding the plug and made of apertured cylindrical segments, an apertured valve body in which the casing is secured and an elastic medium interposed between the casing and the valve body and means for preventing the rotation of the casing within the valve body, consisting of outwardly extending longitudinal flanges on the casing on each side of its apertures and inwardly extending coöperating flanges on the valve body.

27. A valve comprising a central rotatable cylindrical plug having a transverse aperture, a casing surrounding the plug and made of apertured cylindrical segments, an apertured valve body in which the casing is secured and an elastic medium interposed between the casing and the valve body and means for preventing the rotation of the casing within the valve body, consisting of outwardly extending longitudinal flanges on the casing on each side of its apertures and inwardly extending transverse coöperating flanges on the valve body above and below each of its apertures.

28. A valve comprising a central rotatable cylindrical plug having a transverse aperture, a casing surrounding the plug and made of apertured cylindrical segments, an apertured valve body in which the casing is secured and an elastic medium interposed between the casing and the valve body and means for preventing the rotation of the casing within the valve body, while permitting a slight inward and outward movement of the segments with respect to the plug.

29. A valve comprising a central rotatable cylindrical plug having a transverse aperture, a casing surrounding the plug and made of apertured cylindrical segments, an apertured valve body in which the casing is secured and an elastic medium interposed between the casing and the valve body and means for preventing the rotation of the casing within the valve body, while permitting a slight inward and outward movement of the segments with respect to the plug, consisting of outwardly extending flanges on the casing and inwardly extending flanges on the valve body.

30. A valve comprising a central rotatable cylindrical plug having a transverse aperture, a casing surrounding the plug and made of apertured cylindrical segments, an apertured valve body in which the casing is secured and an elastic medium interposed between the casing and the valve body and means for preventing the rotation of the casing within the valve body, while permitting a slight inward and outward movement of the segments with respect to the plug, consisting of outwardly extending longitudinal flanges on the casing on each side of its apertures and inwardly extending coöperating flanges on the valve body.

31. A valve comprising a central rotatable cylindrical plug having a transverse aperture, a casing surrounding the plug and made of apertured cylindrical segments, an apertured valve body in which the casing is secured and an elastic medium interposed between the casing and the valve body and means for preventing the rotation of the casing within the valve body, while permitting a slight inward and outward movement of the segment with respect to the plug, consisting of outwardly extending longitudinal flanges on the casing on each side of its apertures and inwardly extending transverse coöperating flanges on the valve body above and below each of its apertures.

32. A valve casing comprising cylindrical segments each with a longitudinal aperture, and each having a notch at its lower corners, in combination with a surrounding apertured valve body and an inclosed rotatable central apertured plug which extends above the casing and a packing between the casing and the valve body, between the plug and the valve body above the casing and the plug and valve body within the notches of the segments.

33. A valve casing comprising cylindrical segments, each with a longitudinal aperture, and each having a notch at its lower corners, in combination with a surrounding apertured valve body and an inclosed rotatable central apertured plug which extends above the casing and a packing between the casing and the valve body, between the plug and the valve body above the casing and the plug and valve body within the notches of the segments, and means for preventing the rotation of the casing within the valve body.

34. A valve casing comprising cylindrical segments, each with a longitudinal aperture, and each having a notch at its lower corners, in combination with a surrounding apertured valve body and an inclosed rotatable central apertured plug which extends above the casing and a packing between the casing and the valve body, between the plug and the valve body above the casing and the plug and valve body within the notches of the segments, and means for preventing the rotation of the casing within the valve body, consisting of outwardly extending flanges on the casing and inwardly extending flanges on the valve body.

35. A valve casing comprising cylindrical segments, each with a longitudinal aperture, and each having a notch at its lower corners, in combination with a surrounding apertured valve body and an inclosed rotatable central apertured plug which extends above the casing and a packing between the casing and the valve body, between the plug and the valve body above the casing and the plug and valve body within the notches of the segments, and means for preventing the rotation of the casing within the valve body, consisting of outwardly extending longitudinal flanges on the casing on each side of its apertures and inwardly extending coöperating flanges on the valve body.

36. A valve casing comprising cylindrical segments, each with a longitudinal aperture, and each having a notch at its lower corners, in combination with a surrounding apertured valve body and an inclosed rotatable central apertured plug which extends above the casing and a packing between the casing and the valve body, between the plug and the valve body above the casing and the plug and valve body within the notches of the segments, and means for preventing the rotation of the casing within the valve body, consisting of outwardly extending longitudinal flanges on the casing on each side of its apertures and inwardly extending transverse coöperating flanges on the valve body above and below each of its apertures.

Witness my hand this 16th day of December 1908, at New York, N. Y.

JOSEPH ROTHCHILD.

Witnesses:
WILLIAM R. BAIRD,
ALAN C. MCDONNELL.